United States Patent [19]

Podszun et al.

[11] Patent Number: 5,462,687
[45] Date of Patent: Oct. 31, 1995

[54] ELECTROVISCOUS FLUID BASED ON POLYETHER ACRYLATES AS DISPERSE PHASE

[75] Inventors: Wolfgang Podszun; Robert Bloodworth, both of Köln; Günter Oppermann, Leverkusen, all of Germany

[73] Assignee: Bayer Aktiengesellschaft, Leverkusen, Germany

[21] Appl. No.: 162,060

[22] PCT Filed: Jun. 4, 1992

[86] PCT No.: PCT/EP92/01235

§ 371 Date: Dec. 7, 1993

§ 102(e) Date: Dec. 7, 1993

[87] PCT Pub. No.: WO92/22623

PCT Pub. Date: Dec. 23, 1992

[30] Foreign Application Priority Data

Jun. 14, 1991 [DE] Germany ............... 41 19 670.8

[51] Int. Cl.⁶ .................... C10M 171/00; C10M 169/04
[52] U.S. Cl. .................... 252/79; 252/73; 252/78.3; 252/572
[58] Field of Search ................ 252/572, 73, 79, 252/78.3

[56] References Cited

U.S. PATENT DOCUMENTS

| | | | |
|---|---|---|---|
| 4,033,892 | 7/1977 | Stangroom | 252/76 |
| 4,599,291 | 7/1986 | Podszun et al. | 430/114 |
| 4,645,614 | 2/1987 | Goossens et al. | 252/75 |
| 4,668,417 | 5/1987 | Goossens et al. | 252/75 |
| 4,687,589 | 8/1987 | Block et al. | 252/73 |
| 4,702,855 | 10/1987 | Goossens et al. | 252/75 |
| 4,790,522 | 12/1988 | Drutchas | 267/225 |
| 4,898,267 | 2/1990 | Garrett et al. | 192/21.5 |
| 5,014,829 | 5/1991 | Hare, Sr. | 188/267 |
| 5,145,024 | 9/1992 | Doi | 180/312 |
| 5,226,500 | 7/1993 | Doi et al. | 180/312 |
| 5,268,118 | 12/1993 | Bloodworth et al. | 252/73 |
| 5,269,811 | 12/1993 | Hayes et al. | 623/3 |

FOREIGN PATENT DOCUMENTS

| | | |
|---|---|---|
| 0265252 | 4/1988 | European Pat. Off. . |
| 0387857 | 9/1990 | European Pat. Off. . |
| 0432601 | 6/1991 | European Pat. Off. . |
| 3412085 | 10/1985 | Germany . |
| 1-353897 | 10/1989 | Japan . |
| 1282568 | 7/1972 | United Kingdom . |
| 1600280 | 10/1981 | United Kingdom . |

OTHER PUBLICATIONS

Chemical Abstract, Petroleum, p. 4, Week 8948, J01–H, BRID, H08, 89–353847/48, J0 1266–191–A; "Stable electro–viscous liq . . . ", Bridgestone Tire KK, Apr. 19, 1988.

Journal of Applied Physics, vol. 20, Dec. 1949, pp. 1137–1140; "Induced Fibration of Suspension", W. M. Winslow.

*Primary Examiner*—Christine Skane
*Attorney, Agent, or Firm*—Sprung Horn Kramer & Woods

[57] ABSTRACT

In an electroviscous liquid comprising a non-aqueous liquid as a dispersion medium, a dispersed particulate polymer and a dispersant, the improvement wherein the polymer contains polyether and (meth)acrylate units.

12 Claims, No Drawings

ELECTROVISCOUS FLUID BASED ON POLYETHER ACRYLATES AS DISPERSE PHASE

This invention relates to electroviscous fluids containing polymers bearing polyether and (meth)acrylate units as disperse phase.

Electroviscous fluids (EVF's) are dispersions of finely divided hydrophilic solids in hydrophobic, electrically non-conductive oils of which the viscosity may be increased very quickly and reversibly from the liquid to the plastic or solid state under the effect of a sufficiently strong electrical field. Their viscosity responds both the electrical d.c. fields and Lo a.c. fields, the current flow through the EVF being extremely low. Accordingly, electroviscous fluids may be used for any applications in which it is desired to control the transmission of powerful forces by low electric power levels, for example in clutches, hydraulic valves, shock absorbers, vibrators of systems for positioning and holding workpieces in position.

In many known electroviscous fluids, the disperse phase consists of inorganic solids. Electroviscous fluids based on silica gel are known from DE-PS 3 517 281 and 3 427 499. According to EP 265 252, zeolites are used as the disperse phase. DE-PS 3 536 934 describes the use of aluminosilicates. Electroviscous fluids based on polymer particles as the disperse phase have also been proposed. Thus, DE-PS 28 02 494 describes electroviscous fluids containing a polymer bearing free of neutralized acid groups. A polyhydric alcohol bearing acidic groups is disclosed as the disperse phase of electroviscous fluids in DE 2 530 694. JP 1 266 191 (CA 113, 1 00 684) describes electroviscous fluids based on polysiloxane particles modified with polyethylene oxide/polysiloxane block copolymers and doped with water. In the systems mentioned, the electroviscous effect is attributable to charging of the solids with water. These systems generally show favorable electroviscous effects, but often lack stability in storage and can only be used in a limited temperature range.

Anhydrous electroviscous fluids are known from EP 191 585 where electron conductors are mentioned as the disperse phase. EP 387 857 describes electroviscous fluids based on solid electrolyte particles, such as β-aluminum oxide for example. The disadvantage of these systems generally lies in the extreme hardness of the disperse phase which leads to undesirable abrasiveness of the electroviscous fluids. Another disadvantage is the high density of the dispersed particles which can lead to unstable dispersion with a marked tendency towards sedimentation. The poor sedimentation stability of known anhydrous electroviscous fluids is a well-known problem. It is proposed in JP 1 172 496 to introduce bubble-like voids into the dispersed particles in order to reduce their density and to increase their sedimentation stability. In practice, however, this is a difficult objective to achieve.

Known anhydrous electroviscous fluids are not entirely satisfactory. Apart from their high abrasiveness and inadequate sedimentation stability, it is also difficult to combine a high electroviscous effect with a low basic viscosity and high shear stability.

The problem addressed by the present invention was to provide non-abrasive, sedimentation-stable, anhydrous electroviscous fluids which would be distinguished by a high electroviscous effect, a low basic viscosity and high shear stability.

According to the invention, this problem has been solved by an electroviscous fluid of a non-aqueous liquid as the dispersion medium, a particulate polymer containing polyether and (meth)acrylate units as the disperse phase and a dispersant. In a preferred embodiment, the electroviscous liquid according to the invention is characterized in that the polymer contains 50 to 99% by weight polyether units and 1 to 25% by weight (meth)acrylate units.

Non-aqueous liquids suitable as the dispersion medium are, for example, hydrocarbons, such as paraffins, olefins and aromatic hydrocarbons. Silicone oils, such as polydimethyl siloxanes and liquid methyl phenyl siloxanes, are also used. These dispersion media may be used individually or in combinations of two or more types. The solidification point of the dispersion media is preferably lower than −30° C. while their boiling point is above 150° C.

The viscosity of the oils is between 3 and 300 mm²/s at room temperature. Low-viscosity oils having a viscosity of 3 to 20 mm²/s are generally preferred because they provide for a lower basic viscosity of the electroviscous liquid.

In addition, the oil should have a density substantially corresponding to the density of the disperse phase in order to avoid sedimentation. For example, by using fluorine-containing siloxanes either as such or in admixture with other silicone oils, it is possible in accordance with the invention to produce electroviscous liquids which, despite their low basic viscosity, remain stable to sedimentation for several weeks.

Fluorine-containing siloxanes corresponding to the following general formula are suitable for the production of particularly sedimentation-stable electroviscous liquids according to the invention:

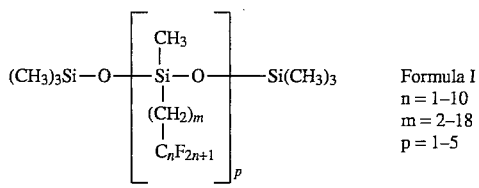

Formula I
n = 1–10
m = 2–18
p = 1–5

The polymers contain 50 to 99% by weight polyether units. A polyether unit is understood to be the following structural unit:

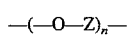

which Z is a $C_{2-4}$ alkylene radical and n is a number from 2 to 1,000 and preferably 2 to 250. Z is preferably —$CH_2$—$CH_2$—, —$CH_2$—$CH_2$—$CH_2$—, —$CH_2$—$CH_2$—$CH_2$—$CH_2$— and —$CH_2$—$CH(CH_3)$— and, more preferably, —$CH_2$—$CH_2$— and —$CH_2$—$CH(CH_3)$—. Within one and the same polyether unit, Z may be the same or different. A combination of 50 to 100% —$CH_2$—$CH_2$— and 0 to 50% —$CH_2$—$CH(CH_3)$— is particularly favorable.

The polyether units may also be branched.

Branched polyether structures are derived, for example, from trimethylol propane or pentaerythritol. Branched polyether structures based on polyethylene oxide, such as

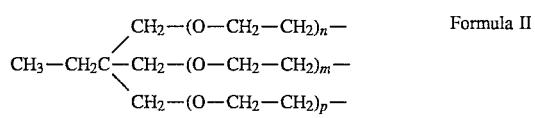

Formula II or

-continued

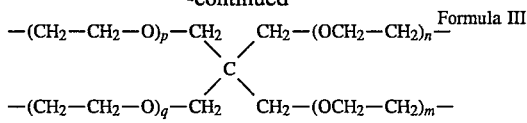

in which n, m, p and q independently of one another are numbers from 2 to 1,000 and preferably 2 to 250, are particularly suitable.

(Meth)acrylate units are understood to be both the acrylate group and also the methacrylate group.

The particulate polymer may be a polymer mixture, for example a mixture of a polyether and a poly(meth)acrylate. One or both components may be linear, branched or crosslinked. The nature of the terminal groups of the polymer components is not critical to the present invention. In the case of the polyethers, the terminal groups may be, for example, hydroxyl or alkyl groups, preferably methyl or ethyl groups.

The polymethacrylate may be a homopolymer or copolymer of methacrylates or acrylates. Examples of suitable (meth)acrylates are methyl acrylate, methyl methacrylate, ethyl acrylate, n-propyl acrylate, isopropyl acrylate, n-butyl acrylate, n-butyl methacrylate, isobutyl acrylate, isobutyl methacrylate, n-hexyl acrylate, n-hexyl methacrylate, ethylhexyl acrylate, ethylhexyl methacrylate, n-octyl acrylate, n-octyl methacrylate, cyclohexyl acrylate, cyclohexyl methacrylate, 4-tert. butyl cyclohexyl methacrylate, benzyl acrylate, benzyl methacrylate, phenylethyl acrylate, phenylethyl methacrylate, furfuryl methacrylate and tetrahydrofurfuryl acrylate. Polymers containing at least partly copolymerized hydroxyfunctional or alkoxyfunctional monomers are preferred and include, for example, 2-hydroxyethyl methacrylate, 2-hydroxypropyl methacrylate, 2-hydroxyethyl acrylate, 2-hydroxypropyl acrylate, 2-methoxyethyl methacrylate, diethylene glycol monomethacrylate, triethylene glycol monomethacrylate, tetraethylene glycol monomethacrylate, diethylene glycol monoacrylate, triethylene glycol monoacrylate, tetraethylene glycol monoacrylate, 3-methoxybutyl methacrylate and 2-butoxyethyl acrylate.

The poly(meth)acrylate may contain a certain percentage of other copolymerized comonomers with no (meth)acrylate units without any effect on its suitability as a component of the disperse phase of the electroviscous liquid according to the invention. The percentage in question is at most about 50% by weight and preferably 25% by weight, based on the poly(meth)acrylate. Suitable comonomers free from (meth)acrylate groups are one or more compounds from the group consisting of unsubstituted or substituted linear, branched and cyclic olefins or aromatic vinyl compounds, unsaturated carboxylic acids or derivatives thereof and vinyl derivatives of carboxylic acids. Suitable aromatic vinyl compounds are styrene, a-methyl styrene, p-methyl styrene, m-methyl styrene, p-tert. butyl styrene, p-chlorostyrene, p-chloromethyl styrene and vinyl naphthalene. Other suitable comonomers are methacrylonitrile and acrylonitrile.

Vinylidene chloride, vinyl chloride, vinyl acetate, vinyl propionate, vinyl laurate and vinyl adipate are also mentioned. Vinyl ethers, for example vinyl isobutyl ether, and maleic acid derivatives, such as maleic anhydride and maleic acid diethyl ester, are also suitable.

The polymethacrylate may be crosslinked by incorporation of difunctional and multifunctional monomer units. Examples of crosslinking monomers are ethylene glycol dimethacrylate, diethylene glycol dimethacrylate, butanediol dimethacrylate, hexanediol dimethacrylate, neopentyl glycol dimethacrylate, glycerol dimethacrylate, glycerol trimethacrylate, trimethylol propane trimethacrylate, pentaerythritol trimethacrylate, pentaerythritol tetramethacrylate and the corresponding acrylates. Other suitable crosslinking agents are allyl (meth)acrylate, divinyl benzene and triallyl cyanurate.

The polyether and (meth)acrylate units are preferably attached at least partly to one another by co-valent chemical bonds. This structure can be achieved by homopolymerization and copolymerization of polyether (meth)acrylates. Polyether acrylates are suitable, those having the following structures

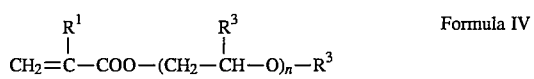

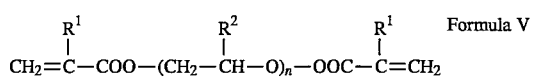

in which $R^1$ and $R^2$ represent H or methyl, $R^3$ represents H or lower alkyl, more particularly methyl and ethyl, n is a number from 2 to 1,000, preferably 2 to 250 and, more preferably, 4 to 100, being particularly suitable.

The particulate polymer may be prepared, for example, by mixing of the individual components, for example using a kneader, and further processing the mixture obtained by melt dispersion.

In one preferred embodiment of the invention, the polymer is prepared by direct polymerization of a monomer or monomer mixture containing polyether units and (meth)acrylate units using a radical former as initiator.

The polyether units may be added to the (meth)acrylate monomer as polyethers terminated, for example, by alkoxy groups. However, they may also form an integral part of the (meth)acrylate monomer. This particular variant applies where monomers corresponding to formulae IV and V are used. Particularly favorable electroviscous effects are obtained where both variants are combined with one another. i.e. where a polyether (meth)acrylate is used and free polyether is additionally incorporated, The polymerization of the acrylate monomers may be carried out by known methods of radical polymerization which are described in detail for example in Houben-Weyl. Methoden der organischen Chemie 4th Edition. "Makromolare Stoffe" G. Thieme Verlao 1987.

It has proved to be particularly effective directly to carry out the polymerization reaction in the carrier liquid. This eliminates the steps of isolating the polymer size reduction (if any) and dispersion. In these processes an initiator, such as for example benzoyl peroxide or azoisobutyrodinitrile, and optionally the other additives mentioned further below are added to the monomer or the monomer mixture which is then dispersed in the carrier liquid with intensive shearing and polymerized at elevated temperature. The compounds described further below are used as dispersion aids. It is of advantage in this regard to use polymerizable dispersants, for example those corresponding to formulae VI to VIII. The particle size of the polymer particles formed may be controlled, for example through the rotational speed of the stirrer preferably a high-speed stirrer.

In one particular embodiment of the invention, the polymer contains one or more electrolytes as additive, The use of such electrolytes to increase the magnitude of electroviscous effect in polymer dispersions has been described in DE-A 4 026 881.

Electrolytes (II) in the context of the invention are sunstances which are soluble in the polymer (I) in molecular or ionic form. Examples of such electrolytes are, for example free acids or salts thereof with alkali metals or alkaline earth metals of organic cations. Accordingly, the electrolytes include such salts as $KCl$, $LiNO_3$, $CH_3COONa$, $LiClO_4$, $Mg(ClO_4)_2$, $KSCN$, $LiBr$, $LiI$, $LiBF_4$, $LiPF_6$, $NaB(C_6H_5)_4$, $LiCF_3$, $SO_3$, $N(C_2H_4)_4Cl$, etc. , $Li_2CO_3$, $ZnCl_2$, $ZnSO_4$, $ZnI_2$, $ZnBr_2$, $LiSO_4$, as well as other organic and inorganic salts of metal ions. Additional electrolytes include the salts of organic anions with metallic and nonmetallic cations, and the salts organic anions with organic or inorganic anions.

Examples of salts with organic anions are the alkyl-, aralkyl-, and arylsulfonates, sulfates and phosphates such as Alkylsulfonates $(RSO_4)_m M_n$ where: $R=C_1-C_{16}$ alkyl, Arylsulfonates $(RSO_4)_m M_n$ where: R=phenyl, naphthyl, pyryl etc., Aralkylsulfonates $(RSO_4)_m M_n$ where: $R=C_8-C_{15}$ aralkyl (e.g. nonylphenyl) etc., Alkylsulfates $(RSO_3)_m M_n$ where: $R=C_2-C_{16}$ alkyl, Alkylpolyether sulfates $(RSO_3)_m M_n$ where: $R=C_2-C_{12}$ alkyl polyether with 2–20 ethylen oxide units, and Alkyl mono- and diphosphates where: alkyl=$C_2-C_{16}$ and where m and n depend on the relative charges of the ions.

These anions can be combined with suitable metal or organic cations such as those described elsewhere in the invention.

Examples of salts with organic cations are the alkyl-, aralkyl-, and arylammonium salts, such as tetraalkylammonium salts ($NR_1R_2R_3R_4$ where: $R_{1-4}=C_1-C_6$ alkyl and/or polyoxyalkylene groups alkylpypidinium salts $(py-R)_m X_n$ where: $R=C_2-C_{16}$ and where m and n depend on the relative charges of the ions.

Suitable anions X are the halogens, phosphates, sulfates, nitrates, acetates, and other inorganic anions. The organic anions described above in the invention can also be combined with organic cations to give particularly soluble salts.

The electrolyte is generally used in a quantity of 0 to 25% by weight, preferably in a quantity of 0.05 to 20% by weight and, more preferably, in a quantity of 0.1 to 10% by weight.

In addition, the polymer may contain other additives, such as plasticizers or stabilizers, preferably in quantities of 0.01 to 10% by weight.

The particulate polymer may be present in various forms. For example, it may be present in the form of polymer chips obtained by a grinding process. It may also be present with advantage in rodlet or fiber form, in which case an LD ratio (quotient of length and diameter) of 1.5 to 20 is favorable. The fibrous form may be obtained by spinning, for example by melt spinning. However, the spherical form is particularly preferred because electroviscous fluids according to the invention having particularly low basic viscosities can be obtained in this case. The spherical form is obtained in the preferred production process described above.

The average particle diameter of the particulate polymer is from 0.2 to 50 μm and preferably from 2.5 to 20 μm. The electroviscous fluid according to the invention contains 10 to 75% by weight, preferably 20 to 70% by weight and, more preferably, 30 to 65% by weight of the particulate polymer. Suitable dispersants for the disperse phase are surfactants soluble in the dispersion medium which are derived, for example, from amines, imidazolines, oxazolines, alcohols, glycol or sorbitol. Polymers soluble in the dispersion medium may also be used. Suitable polymers are, for example, polymers containing 0.1 to 10% by weight N and/or OH and 25 to 83% by weight $C_{4-24}$ alkyl groups and having a molecular weight in the range from 5,000 to 1,000,000. The N- and OH-containing compounds in these polymers may be, for example, amine, amide, imide, nitrile, 5- to 6-membered N-containing heterocyclic rings or an alcohol while the $C_{4-24}$ alkyl groups may be esters of acrylic or methacrylic acid. Examples of the N- and OH-containing compounds mentioned are N,N-dimethylaminoethyl methacrylate, tert. butyl acrylamide, maleic imide, acrylonitrile, N-vinyl pyrrolidone, vinyl pyridine and 2-hydroxyethyl methacrylate. The polymeric dispersants mentioned generally have the advantage over the low molecular weight surfactants that the dispersions prepared with them are more stable in the sedimentation behavior.

Modified styrene/butadiene block copolymers according to DE 3 412 085 are mentioned as further dispersants. These particular dispersants are particularly suitable for electroviscous fluids based on hydrocarbons as the continuous phase.

Polysiloxane-based dispersants are preferably used for the production of electroviscous fluids according to the invention containing silicone oil as the carrier liquid. For example, polysiloxanes modified by amino or hydroxy groups are suitable. Polysiloxane/polyether copolymers are also suitable. Products such as these are commercially available. Polymerizable dispersants, particularly those containing acrylate or methacrylate groups, are suitable for the production of particularly stable dispersions. Examples of polymerizable dispersants, which are particularly suitable for dispersions in silicone oils, are represented by the following formulae

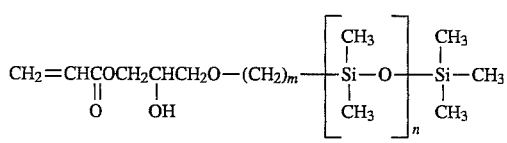

Formula VI
n: 4–100 m: 2–18

-continued

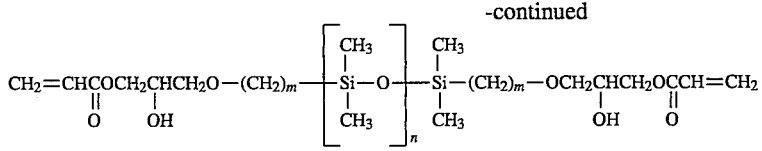

Formula VII
n: 4–100 m: 2–18

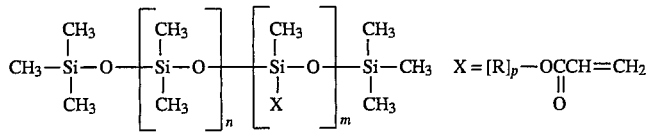

Formula VIII
n: 4–100 $^n$/m: 2–10    R = $-O-CH_2-CH_2-$,
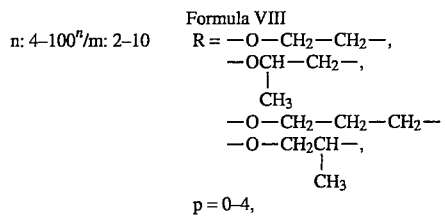
p = 0–4,

The dispersant or the mixture of several dispersants is used in quantities of 0.1 to 12% by weight and preferably in quantities of 0.5 to 6% by weight, based on the electroviscous fluid.

The electroviscous fluids according to the invention may be analyzed in a modified rotational viscosimeter of the type described by W. M. Winslow in J. Appl. Phys. 20 (1949), pages 1137 to 1140.

The basic viscosity V(0) and the relative increase in viscosity V(r) were determined in order to characterize the following examples. The measuring arrangement used and the definition of the physical parameters are described in detail in EP-A 432 601. In addition, dispersion stability (sedimentation behavior) and abbrasiveness were determined.

The electroviscous fluids according to the invention show extremely favorable electrorheological properties for practical application. In addition, they remain stable to sedimentation for long periods (a few months) and are not abrasive.

This invention also comprises a functional element (device) containing an anode and a cathode and the electroviscous liquid according this invention extending at least partly between said anode and said cathode, the function (property, mode of operation) of said element being altered by alteration of the electrical field between said anode and said cathode due to a change of viscosity of said liquid, Such functional elements (devices) are known in principle.

Such functional elements comprise shock and vibration dampers, pneumatic valves, means for force transmission such as clutches, movement sensors.

Generally the function of such elements comprises influencing the flow of the liquid through a tube or hole, or the viscous friction between two planes (also concentric cylindrical planes),movable relative to each other, by the electrical field.

Examples for dampers are disclosed in DE-A 3 920 347, DE-A 4 101 405, DE-A 4 120 099, US-A 4,790,522, US-A 4,677,868, GB-A 1 282 568, DE-A 3 336 965, US-A 5 014 829, EP-A 427 413, EP-A 183 039, DE-A 3 334 704, DE-A 3 330 205, U.S. Pat. No. 4,898,084.

Examples for clutches are disclosed in US-A 4 802 560, US-A 4 840 112, EP-A 317 186, US-A 4 815 674, US-A 4 898 266, US-A 4 898 267, GB-A 2 218 758, DE-A 3 128 959, US-A 2 417 850, U.S. Pat. No. 2 661 825.

Other functional elements are disclosed in WO 9 108 003 (electrohydraulic pump system for artificial hearts), GB-A-2 214 985 (fluid flow control valve), GB-A 3 984 086 (electroviscous vibrator), DE-A 4 003 298 (hydraulic numb or motor).

Example 1

Preparation of a dispersant 1,000 ml cyclohexane, 5 ml glycol dimethyl ether and 50 g styrene were introduced into a 2 liter glass autoclave in the absence of water and oxygen. The mixture is carefully titrated with a 1-molar n-butyl lithium solution in n-hexane until it turns pale yellow in color. 3 ml of the 1-molar butyl lithium solution are then added. The polymerization temperature is kept at 40° C. by external cooling. After a reaction time of 60 minutes, 50 g butadiene are added and polymerization is continued for 60 minutes at 50° C. The conversion is then complete. 48 ml n-dodecyl mercaptan and 0.5 g azodiisobutyronitrile are then added, followed by heating for 5 h at 80° C.

After cooling to room temperature, the block polymer is precipitated from the cyclohexane solution with 2,000 ml ethanol, to which 2 g 2,6-di-tert.-butyl-p-methyl phenol have been added, and dried in vacuo to constant weight. 140 g of a colorless block copolymer are obtained. [η]=0.272 dl/g, toluene/25° C. ; 4.5% by weight sulfur in the polymer.

Example 2

(PWL 2245 D)

2.8 g of the dispersant of Example 1 are dissolved in 60 g isododecane in a reaction vessel equipped with a high-speed stirrer. A mixture of 20 g octaethylene glycol dimethacrylate, 20 g branched polyethylene oxide, molecular weight 675, prepared by ethoxylation of trimethylol propane and 0.4 g dibenzoyl peroxide is dispersed in the resulting solution at high stirrer speeds (2,000 r.p.m.). The emulsion obtained is heated for 3 h at 90° C. with continuous stirring. A dispersion is obtained and may be used as an electroviscous fluid without further aftertreatment Example 3

(PWL 2551 B)

Example 2 was repeated using a mixture of 10 g octaethylene glycol dimethacrylate, 10 g branched polyethylene oxide, molecular weight 675, prepared by ethoxylation of trimethylol propane and 0.4 g dibenzoyl peroxide.

Example 4

(PWL 2547 C)

Example 2 was repeated using a mixture of 10 g octaethylene glycol dimethacrylate, 10 g branched polyethylene oxide, molecular weight 675, prepared by ethoxylation of trimethylol propane, 5 g lithium nitrate and 0.4 g dibenzoyl peroxide.

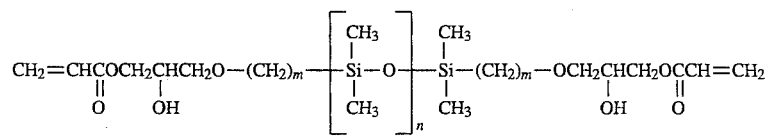

Example 5

(PWL 2548 A)

In a reaction vessel equipped with a high-speed stirrer, 2.8 g of the dispersant corresponding to formula VIII (m=2, n=50) are dissolved in 60 g polydimethyl siloxane (viscosity at 25° C. : 5 mm²/s, density: 0.9 g/cm³). A mixture of 20 g octaethylene glycol dimethacrylate, 20 g branched polyethylene oxide, molecular weight 675, prepared by ethoxylation of trimethylol propane and 0.4 g dibenzoyl peroxide were dispersed in the resulting solution at high stirrer speeds (2,000 r.p.m.). The emulsion obtained is heated for 3 h at 90° C. with continuous stirring.

Example 6

Testing of the electroviscous fluids of Examples 2 to 5

| EVL | V(O)* mPa · s | V(r)** % | Sedimentation stability |
|---|---|---|---|
| 2 | 14 | 4500 | Very Good |
| 3 | 54 | 3100 | Very Good |
| 4 | 44 | 3400 | Very Good |
| 5 | 76 | 2200 | Very Good |

*at 25° C., shear rate 1,000/sec., field strength 0 V/mm
**relative change in viscosity at 25° C., shear rate 1,000/sec., field strength 3,000 V/mm.

It will be understood that the specification and examples are illustrative but not limitative of the present invention and that other embodiments within the spirit and scope of the invention will suggest themselves to those skilled in the art.

We claim:

1. In a stable electroviscous fluid comprising a dispersion medium, a particulate polymer therein and at least one dispersant wherein said dispersant is polysiloxane-based and contains acrylate or (meth)acrylate groups or is a styrene/butadiene copolymer which is present in an amount sufficient to disperse said particulate polymer, the improvement wherein:

said fluid comprises a non-aqueous liquid, and
said particulate polymer contains polyether ether and (meth) acrylate units.

2. A stable electroviscous fluid according to claim 1, wherein the dispersant is of the formula

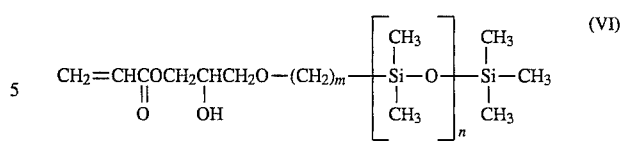

in which n=4–100 and m=2–18.

3. A stable electroviscous fluid according to claim 1, wherein the dispersant is of the formula

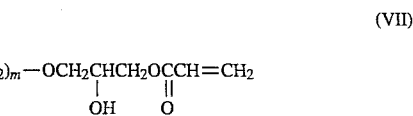

in which n=4-100 and m=2-18.

4. A stable electroviscous fluid according to claims 1, wherein the dispersant is present in 0.1 to 12% by weight of the electroviscous fluid.

5. A stable electroviscous fluid according to claim 1, wherein the particulate polymer is present in 30 to 65% by weight of the electroviscous fluid.

6. An electroviscous fluid according to claim 1, wherein the particulate polymer contains polymerized polyether acrylate groups.

7. An electroviscous fluid according to claim 6, wherein the polyether acrylate groups are of at least one of the formulas

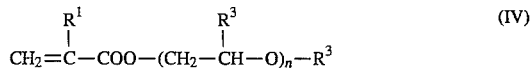

and

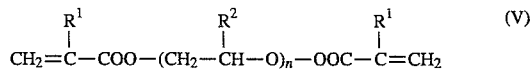

in which $R^1$ and $R^2$ represent H or methyl, $R^3$ represents H or lower alkyl, and n is a number from 2 to 1,000.

8. An electroviscous fluid according to claim 7, wherein n is a number from 2 to 250.

9. An electroviscous fluid according to claim 7, wherein n is a number from 4 to 100 .

10. An electroviscous fluid according to claim 1, wherein the polymer is doped with electrolyte.

11. A stable electroviscous fluid according to claim 1, wherein the dispersant is of the formula

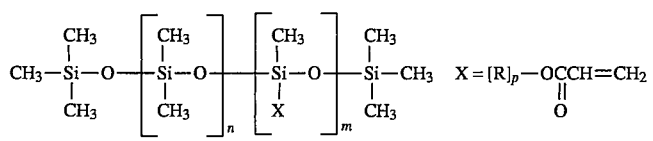
Formula VIII
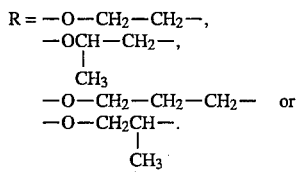
12. In a functional device comprising an anode, a cathode and an electroviscous fluid located at least partly therebetween, the function of said device being altered by changes in the viscosity of said fluid, the improvement wherein said fluid is an electroviscous fluid according to claim 1.
* * * * *